US008527980B2

(12) United States Patent
Stich et al.

(10) Patent No.: US 8,527,980 B2
(45) Date of Patent: Sep. 3, 2013

(54) SYSTEM AND METHOD FOR AUTOMATICALLY UPGRADING FUNCTIONALITIES IN A DISTRIBUTED NETWORK

(75) Inventors: Christian M. Stich, Leutershausen (DE); Marcel Dix, Mannheim (DE)

(73) Assignee: ABB Research Ltd, Zürich (CH)

( * ) Notice: Subject to any disclaimer, the term of this patent is extended or adjusted under 35 U.S.C. 154(b) by 1643 days.

(21) Appl. No.: 11/664,843

(22) PCT Filed: Dec. 20, 2005

(86) PCT No.: PCT/EP2005/013716
§ 371 (c)(1),
(2), (4) Date: Apr. 6, 2007

(87) PCT Pub. No.: WO2006/066880
PCT Pub. Date: Jun. 29, 2006

(65) Prior Publication Data
US 2008/0134164 A1      Jun. 5, 2008

(30) Foreign Application Priority Data
Dec. 20, 2004   (DE) .................. 10 2004 062 434

(51) Int. Cl.
*G06F 9/44*           (2006.01)
(52) U.S. Cl.
USPC ........................................................ 717/172
(58) Field of Classification Search
None
See application file for complete search history.

(56) References Cited

U.S. PATENT DOCUMENTS 6,151,643 A     11/2000  Cheng et al.
6,282,514 B1 *   8/2001  Kumashiro .................. 705/7.11
(Continued)

FOREIGN PATENT DOCUMENTS

DE   102 08 530 A1   9/2003
DE   103 56 348 A1   6/2005
(Continued)

OTHER PUBLICATIONS

International Search Report dated Apr. 20, 2006.

*Primary Examiner* — Wei Zhen
*Assistant Examiner* — Adam R. Banes
(74) *Attorney, Agent, or Firm* — Buchanan Ingersoll & Rooney PC (57) ABSTRACT

The invention relates to a system and to a method for automatically providing system software which is filed in software packets, for system nodes which are arranged in a distributed network, in particular in a distributed automatic system. The inventive system comprises at least one system diagnosis tool which analyses the current state of the system of the distributed network and combines the current state of the data in system status data which is guided to at least one knowledge-based planning tool. Said knowledge-based planning tool produces a system plan for a novel system version, based on control and data, from the system status data and a planning data base, generating installation data for an automatic installation and configuration of the system configuration based on the produced system plan for the system nodes of the distributed network, and guides the installation data to at least one installation and configuration tool, provided in the system nodes. The installation and configuration tool, of the respective system node automatically selects, from the installation data, the software packets which are to be installed, installs and configures said latter, which enable, after configuring the installed software packets, the functionality of the distributed network to be re-established.

28 Claims, 3 Drawing Sheets

(56) References Cited

U.S. PATENT DOCUMENTS

| | | |
|---|---|---|
| 6,922,722 B1 * | 7/2005 | Mann et al. .................. 709/220 |
| 7,293,169 B1 * | 11/2007 | Righi et al. ........................ 713/2 |
| 7,752,156 B2 * | 7/2010 | Stich et al. ...................... 706/50 |
| 2002/0049709 A1 * | 4/2002 | Miyasaki et al. ................. 707/1 |
| 2002/0100036 A1 * | 7/2002 | Moshir et al. ................. 717/173 |
| 2002/0112231 A1 * | 8/2002 | Lundback et al. ............ 717/170 |
| 2002/0170052 A1 * | 11/2002 | Radatti ........................ 717/171 |
| 2002/0174264 A1 | 11/2002 | Fuller et al. |
| 2002/0174422 A1 * | 11/2002 | Kelley et al. ................. 717/178 |
| 2002/0184619 A1 * | 12/2002 | Meyerson ..................... 717/173 |
| 2003/0037322 A1 * | 2/2003 | Kodosky et al. ............. 717/162 |
| 2003/0126194 A1 * | 7/2003 | Kase et al. .................... 709/202 |
| 2003/0145315 A1 * | 7/2003 | Aro et al. ...................... 717/170 |
| 2003/0154470 A1 * | 8/2003 | Applin et al. ................. 717/170 |
| 2003/0159137 A1 * | 8/2003 | Drake et al. .................. 717/172 |
| 2003/0177486 A1 * | 9/2003 | Bakke et al. .................. 717/169 |
| 2003/0192040 A1 * | 10/2003 | Vaughan ....................... 717/173 |
| 2003/0229890 A1 * | 12/2003 | Lau et al. ...................... 717/168 |
| 2003/0233648 A1 * | 12/2003 | Earl et al. ...................... 717/176 |
| 2004/0015949 A1 * | 1/2004 | Taylor ........................... 717/171 |
| 2004/0060045 A1 * | 3/2004 | Hind et al. .................... 717/174 |
| 2004/0148184 A1 * | 7/2004 | Sadiq ................................ 705/1 |
| 2004/0172462 A1 * | 9/2004 | Iterum et al. .................. 709/223 |
| 2004/0187103 A1 * | 9/2004 | Wickham et al. ............. 717/168 |
| 2004/0187104 A1 * | 9/2004 | Sardesai et al. ............... 717/174 |
| 2004/0230948 A1 * | 11/2004 | Talwar et al. ................. 717/114 |
| 2004/0268341 A1 * | 12/2004 | Kenworthy .................... 717/174 |
| 2005/0010916 A1 * | 1/2005 | Hagen et al. .................. 717/170 |
| 2005/0022177 A1 * | 1/2005 | McCaleb et al. ............. 717/171 |
| 2005/0091369 A1 * | 4/2005 | Jones ............................. 709/224 |
| 2005/0096025 A1 * | 5/2005 | Qumei et al. ................. 455/418 |
| 2005/0120347 A1 * | 6/2005 | Asare et al. ................... 717/177 |
| 2005/0144616 A1 * | 6/2005 | Hammond et al. ........... 717/173 |
| 2005/0149922 A1 * | 7/2005 | Vincent ......................... 717/172 |
| 2005/0166198 A1 * | 7/2005 | Gigliotti et al. .............. 717/172 |
| 2005/0193386 A1 * | 9/2005 | McCaleb et al. ............. 717/168 |
| 2005/0198044 A1 * | 9/2005 | Kato et al. .................... 707/100 |
| 2005/0198247 A1 * | 9/2005 | Perry et al. ................... 709/223 |
| 2005/0228832 A1 * | 10/2005 | Ghotge et al. ................ 707/200 |
| 2005/0235281 A1 * | 10/2005 | Lefrancois .................... 717/175 |
| 2005/0256735 A1 * | 11/2005 | Bayne ................................ 705/1 |
| 2005/0262501 A1 * | 11/2005 | Marinelli et al. ............. 717/174 |
| 2005/0273486 A1 * | 12/2005 | Keith, Jr. ...................... 709/200 |
| 2007/0078059 A1 * | 4/2007 | Stich et al. .................... 505/126 |
| 2007/0214028 A1 * | 9/2007 | Stich et al. ........................ 705/8 |
| 2008/0028394 A1 * | 1/2008 | Stich et al. .................... 717/177 |
| 2008/0028396 A1 * | 1/2008 | Stich et al. .................... 717/177 |

FOREIGN PATENT DOCUMENTS

| | | |
|---|---|---|
| EP | 0 703 531 A1 | 3/1996 |
| EP | 1 398 975 A1 | 3/2004 |
| WO | 01/93021 A2 | 12/2001 |
| WO | WO 01/93021 A2 * | 12/2001 |

* cited by examiner

Fig. 3

SYSTEM AND METHOD FOR AUTOMATICALLY UPGRADING FUNCTIONALITIES IN A DISTRIBUTED NETWORK

The invention relates to a system and a method for automatically upgrading system software stored in software packages, preferably from an installed version to a higher version, for system nodes arranged in a distributed network, in particular in a distributed automatic system.

BACKGROUND INFORMATION

The structure of a distributed network comprises a multiplicity of system nodes which are interconnected via a network structure, for example in a client-server relationship, and provide functionalities which cannot be provided by means of an individual component. Operator stations, engineering stations, archiving stations, control devices with processing stations, input and output units and communications interfaces, for example, are used as system nodes in the distributed network.

The functional components are normally distributed among a multiplicity of system nodes, also referred to below as a computer or data processing device, which are interconnected via one or more physical networks. Operating systems, application programs, control programs and various functional components of the system are installed on the system nodes, whereby the individual nodes with their various functional components are dependent on one another in different ways.

In order to upgrade the system software, which is stored in software packages, a new or improved system version is installed on the computers of the distributed system, while retaining the user-specific applications, such as, for example, project data and settings, whereby the functional components of the existing system are replaced with new components and the upgraded system is able to provide the same, albeit modernized, fundamental functionality. This procedure is referred to below as a system upgrade.

Methods currently employed use, for example, installation programs, referred to as software installers, which perform the system upgrade on a single computer of the distributed system. Prior to the installation of the new programs, these installation programs check the existing software configuration on the computer and, in the event of a re-installation, suggest alternatives according to the available upgrade facilities of the software.

A detailed knowledge of the dependencies between the individual system nodes is required in order to take into account the dependencies between the individual system nodes of the distributed automatic system when the software packages are upgraded.

Installation manuals often offer only a general knowledge of the existing dependencies between the distributed system software. The planning of the system upgrade and the identification of the existing system components which need to be replaced with upgraded new components must be carried out manually by the user.

Comprehensive expert knowledge is required to install the new software packages on the various system nodes and configure the relationships and dependencies between the system nodes, since the procedure for installing and configuring the software packages is often only inadequately described and is difficult to follow in the guidelines and instructions prescribed for that purpose.

Even existing analysis tools consider only compatibilities of individual software packages and their versions with one another on one computer, but not logical system-related dependencies, such as, for example, in relation to computer-independent software packages.

No dependency rules can be formulated for planning an automatic upgrade for all system nodes of the distributed system.

Newer versions of the complete system software are normally offered in a plurality of software packages, which the user himself must identify in order to ascertain which system components need to be upgraded and installed on which nodes, or which system components need to be replaced with a new version.

The system structure plans and the identification of the system components for a complete and correct installation of the interrelationships and interdependencies of the system components are also manually created and checked separately for each system component, whereby the administrative effort involved in upgrading the software packages is highly time-consuming and increases in proportion to the scope of the system topology.

An automatic installation, configuration and system diagnosis of the distributed system with an upgraded, newer version of the system software of the distributed automatic system over an existing version cannot be carried out with the methods currently employed.

SUMMARY

The object of the invention is therefore to indicate a system for automatically upgrading the functionalities stored in software packages, in particular in operating systems, application programs, control programs and/or various functional components of the system, for system nodes arranged in a distributed network, in particular in a distributed automatic system, whereby the aforementioned disadvantages are avoided.

This object is achieved according to the invention by a system with the features indicated in claim 1. Advantageous designs, improvements of the system according to the invention and a corresponding method for implementing a system of this type are indicated in further claims and in the description.

According to the invention, the system for automatically upgrading functionalities stored in software packages, also referred to below as system software, for system nodes arranged in a distributed network, in particular in a distributed automatic system, comprises a system diagnosis tool which analyzes the current system status of the distributed network by iterating system diagnosis functions of the system diagnosis tool via the individual system nodes in the distributed system and by analyzing them for existing system components of the system nodes. By means of an analysis tool provided in the system diagnosis tool, the system functions supported by the currently installed automatic system and the system structure are first identified (e.g. the number of operator stations and servers present in the system and the manner in which these are interlinked). This ensures that precisely this system with its characteristics is restored in the newer system version following the upgrade. To do this, the analysis tool identifies the software and hardware which is installed on each individual system node of the distributed network. To do this, the analysis tool iterates via the individual system nodes and identifies the existing software and/or hardware.

In order to upgrade the functionalities of the automatic system, the system diagnosis tool collects the system-related data of the distributed automatic system via the system nodes, for example by means of the analysis tool, and summarizes the collected data in the system status file. The system information collected in this way forms the basis for the implementation of the system upgrade by means of a knowledge-based planning tool.

The knowledge-based planning tool automatically creates a system plan for a new system version from the system status file and a planning database, in which general installation rules and system dependencies are stored, by mapping the system components of the system nodes of the installed system onto the corresponding components of the new system version.

To do this, the planning tool resolves logical dependencies between the system nodes and functionalities of the distributed automatic system and between the requirements of the new system version and thus ensures in an advantageous manner that, following the definition of the new system version, only valid system plans are generated with the correct system components for the respective functionality to be supported, distributed among the individual system nodes. Thus, for example, a software package of a system node of the distributed automatic system in the new version can also be installed on further nodes. It is optionally provided for these nodes in the new version that a further software package which was not yet available in an earlier version can additionally be installed. Higher performance requirements for the hardware of the individual system nodes are also provided when the system file is created.

The planning tool generates installation files for automatic installation and configuration of the system upgrade on the basis of the created system plan for the system nodes of the distributed network.

To do this, the planning tool is preferably stored in a separate planning computer and, from the system components of the upgraded version, automatically constructs a complete system configuration which matches the configuration of the installed system and has the same system functionalities. The planning database stored in the planning tool for this purpose comprises a model of a new system version with planning rules, system dependencies, for example interdependencies of the software packages, system information, such as, for example, definitions of the system node types, possible configuration combinations of the system components minimum and maximum system limit information, such as, for example, definitions of the maximum number of operator stations, system installation requirements and system configuration steps.

The planning tool operates on the planning database, comprising the planning and the underlying planning data, together forming a knowledge-based system.

The installation files preferably comprise information relating to the node type and the name of each system node, the required operating system, requirements for external basic software, additional hardware requirements, a compilation of software packages to be installed depending on the respective system node and/or configuration data of the system nodes.

The created installation files are in each case forwarded to an installation and configuration tool present in the system nodes, which automatically selects from the installation files, installs and configures the software packages to be installed.

Following the configuration of the installed software packages, the functionality and the system characteristics of the distributed network are advantageously restored in a more up-to-date system version, in particular
the type and number of operator stations and/or engineering stations,
the ability to communicate with connected control devices with the number of connection stations,
supported redundancies of system nodes,
selected combinations of client/server structures on the same system node,
installations of selected system applications,
the type and number of application servers,
the number of domain servers or, alternatively, the selection of a workgroup and/or the domain names, i.e. the organizational unit for administering the servers in the distributed network and/or the network characteristics and/or the division of the network into a plurality of subnetworks and/or network redundancies,
the name and the identification addresses of the individual system nodes,
created user and access rights of the domain and the automatic system,
the system names and/or further user-specific system configurations.

Following successful automatic installation of the software packages in the system nodes of the distributed system, the system nodes are automatically configured and the previously backed up application data of the automatic system or the technical installation can then be reloaded onto the new system.

In an alternative design variant, the configuration of the software packages can also be carried out in a user-controlled manner.

A further design variant of the invention is based on the principle that the analysis tool determines necessary extensions and/or adaptations of the hardware of the system nodes of the distributed system. To do this, the analysis tool reads in the corresponding generated installation files from the planning tool, compares these with the current hardware and generates, for example, a report on hardware that is to be additionally installed.

In a further advantageous design of the invention, the analysis tool is provided in order to automatically carry out a check and/or verification of the functionality of the distributed network and/or generate a system status report.

The method with which the object is furthermore achieved is described in claim 12. Here, the current system status of the distributed network is analyzed by means of a system diagnosis tool and summarized in a system status file. The system status file is forwarded to a knowledge-based planning tool, preferably installed on a planning computer.

According to the invention, a system plan for a new system version is created from the system status file and a planning database by means of the knowledge-based planning tool.

Installation files for automatic installation and configuration of the system upgrade are generated on the basis of the created system plan for the system nodes of the distributed network and the installation files are in each case forwarded to an installation and configuration tool present in the system nodes.

New software packages to be installed with the corresponding system software are automatically selected from the installation files, installed and configured by means of the installation and configuration tool of the respective system node, so that the functionality of the distributed network is restored following the configuration of the installed software packages.

The procedure for installing and configuring a more up-to-date version of the system software of a distributed automatic system over an existing version is carried out in an advantageous manner with the method according to the invention. The method automates the installation of the new system software and optionally comprises an automatic system diagnosis of the existing automatic system. The system diagnosis analyzes the individual system nodes for system functionalities already installed and from this generates a status report on the entire network.

The method described thus enables automatic restoration of the distributed system with its functionalities in a newer version.

In an advantageous manner, no expert knowledge is required for the automatic installation and configuration of the more up-to-date version of the system software, since the installation and configuration of the system software are carried out automatically for all system nodes of the distributed network.

BRIEF DESCRIPTION OF THE DRAWINGS

The invention and advantageous designs and improvements of the invention are explained in detail and described with reference to the example embodiment shown in FIGS. 1 to 3, in which.

DETAILED DESCRIPTION

Figure 1:
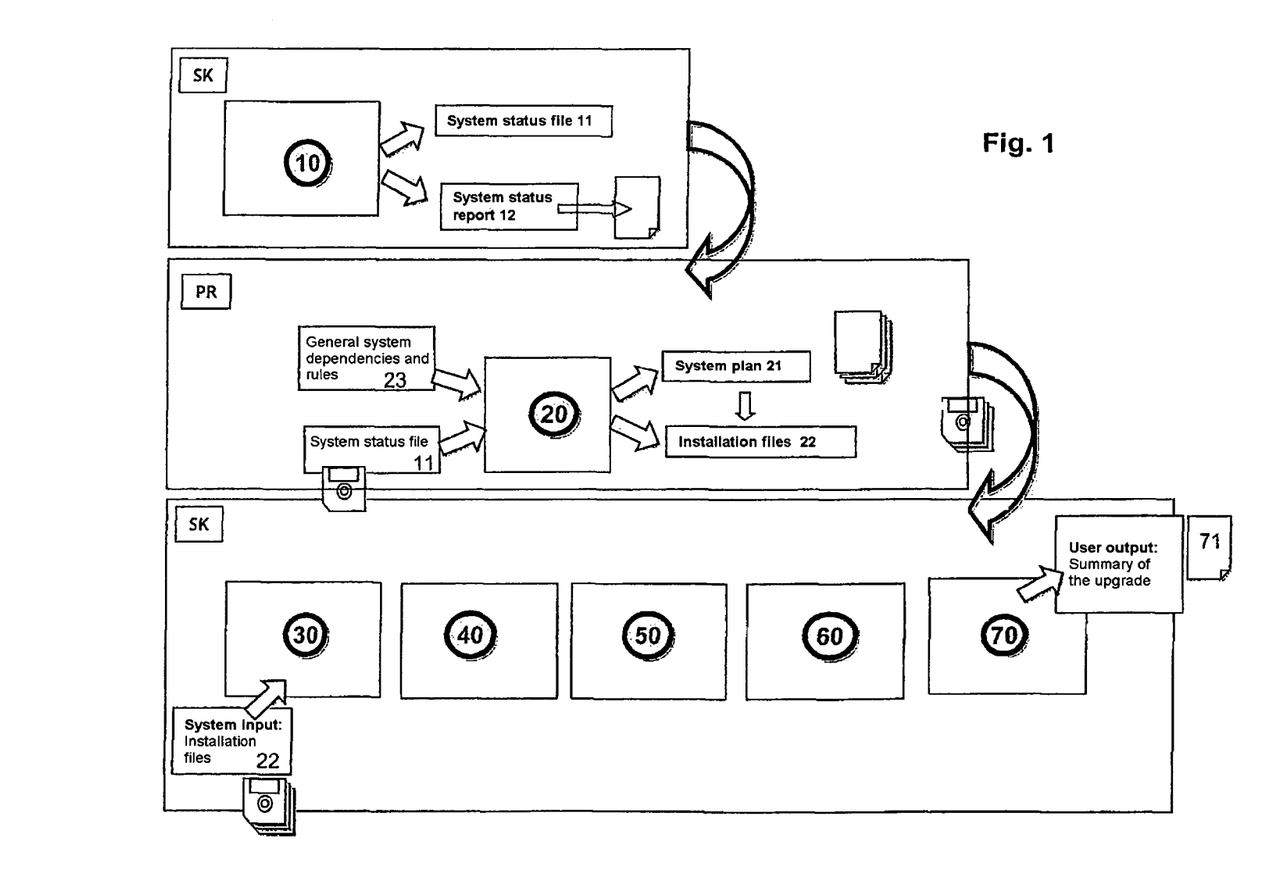
FIG. 1 shows a design form of the system according to the invention for automatically upgrading system software stored in software packages for a system node arranged in an automatic system.

FIG. 1 shows an example of a design form of the system according to the invention for automatically upgrading system software stored in software packages for a system node SK arranged in an automatic system, whereby the system nodes SK are, for example, operator stations, engineering stations, archiving stations and controllers with processing stations, input and output units and communications interfaces. Only one system node SK is shown as an example in FIG. 1.

The system software integrated in the software packages comprises, in particular, operating systems, application programs, control programs and/or functional components of the automatic system.

A system diagnosis tool 10 is stored in each case in the system nodes SK of the system according to the invention for automatically upgrading system software stored in software packages for a distributed automatic system. The system diagnosis tool 10 analyzes the current system status of the automatic system by collecting the system-related data of the automatic system by means of an analysis tool via the system nodes SK of the distributed network, and by collating a system status file 11 from the current system status. The system status file 11 is forwarded to a knowledge-based planning tool 20, which is arranged in a separate planning computer.

The system diagnosis tool 10 analyzes the individual system nodes for system functionalities already installed and from this generates a status report 12 on the current overall system. The status report 12 on the current system status, which is contained in the system status file, records the functionalities that are present in the currently installed system. The planning tool 20 requires this information in order to identify the functionalities that need to be upgraded.

The knowledge-based planning tool 20 creates a system plan 21 for a new system version from the system status file 11 and a planning database 23. The system plan 21 may optionally be output or displayed, for example in the form of a report on the planned upgrade.

On the basis of the created system plan 21 for the system nodes SK of the distributed automatic system, the planning tool 20 generates installation files 22 for automatic installation and configuration of the system upgrade for the system nodes SK of the distributed system.

The generated installation files 22 are forwarded in each case to an installation and configuration tool 50, 60 present in the system nodes SK, which automatically selects from the installation files 22, installs and configures the software packages to be installed and restores the functionality of the entire automatic system.

In an advantageous design of the invention, the analysis tool 70 automatically performs a verification of the functionality of the automatic system on the individual system nodes. With this final verification, the successful restoration of all functionalities in the new system version is concluded.

To do this, the analysis tool 70, which has already previously collected the system-related data of the automatic system via the system nodes SK of the distributed network, checks the completeness of the performed system extension of the system software of all system nodes and creates a status report 71 with the information on the system software upgrade and the upgraded system status of the distributed system. This report 71 forms, for example, as a system pass, the basis for future service activities and upgrades on the automatic system.

Before the new system software is set up, the hardware of the individual system nodes SK must often be adapted to the requirements of the new version.

The analysis tool 70 is thus also provided to ascertain, from the planning tool 20, necessary extensions and/or adaptations of the hardware of the respective system nodes SK of the distributed system by means of the generated installation files 22.

The analysis tool 70 alerts the user automatically to any new hardware requirements of the individual system nodes SK which have not been met. To do this, the analysis tool reads in the corresponding generated installation files 22 from the planning computer PR, and compares the files 22 with the currently installed hardware. The ascertained hardware extensions are output or indicated, for example, in the form of a report 30 on additional hardware requirements.

For the installation and configuration of the operating system and network, the generated installation files 22 receive individual scripts for each system node SK for the automatic installation and configuration of the operating system and network. This automatically ensures, for example, that the correct operating system is pre-installed on the individual servers or clients of the system. Further scripts set, for example, the names of the system nodes SK and identification addresses of the system nodes, and add them to the corresponding system domain. The scripts are automatically activated here by a tool 40.

Figure 2:
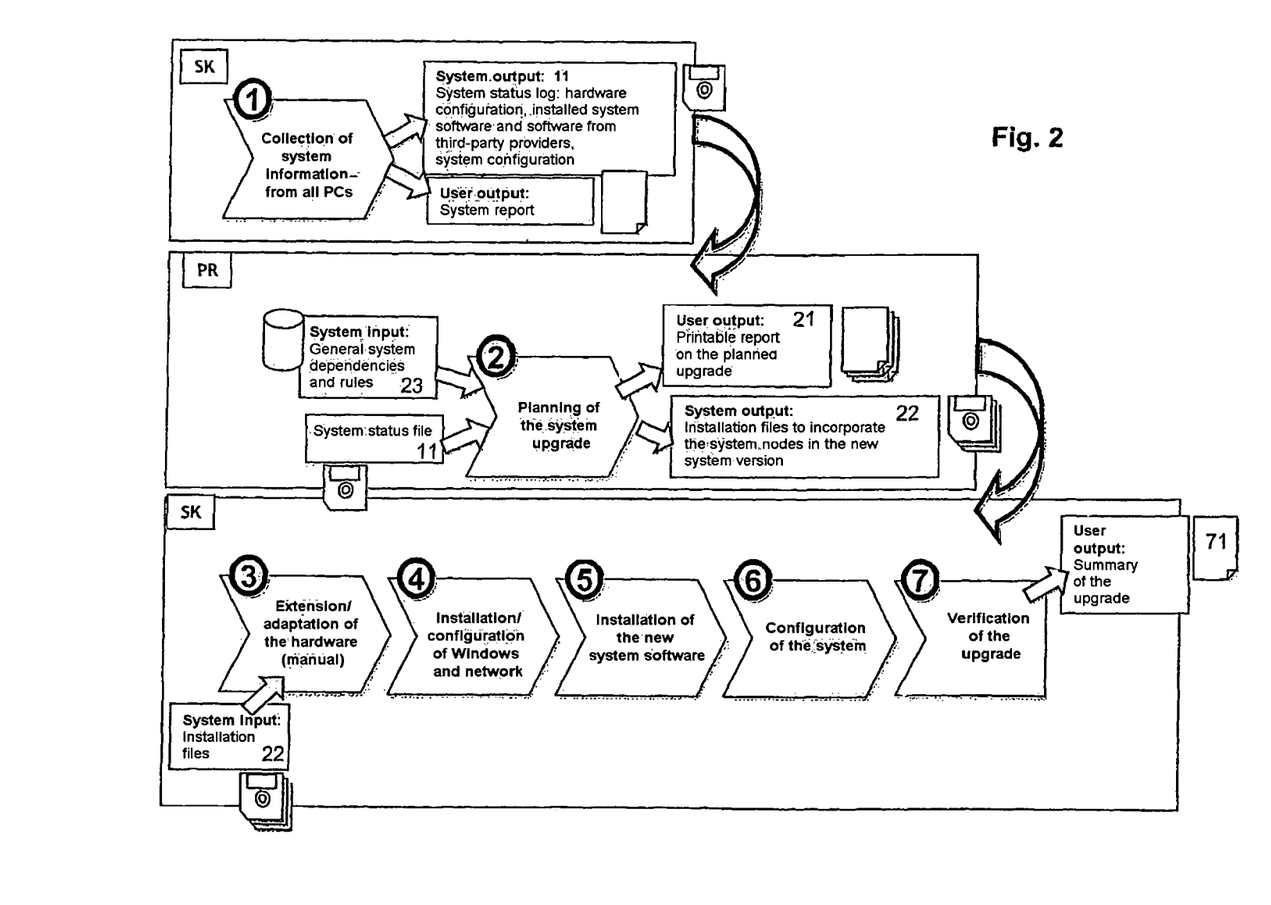
FIG. 2 shows an example of the procedure for automatically upgrading system software stored in software packages for system nodes arranged in an automatic system.

FIG. 2 shows an example of the procedure for automatically upgrading system software stored in software packages for system nodes arranged in an automatic system.

The method according to the invention describes a number of steps with which the software packages are automatically upgraded for each individual system node SK and all information required in order to restore the system functionality is compiled in a newer version in a plurality of the installation files 22. The installation files 22 are used as input for the subsequent steps of the method and an individual set of defined node-specific files is generated for each node.

In a first step 1, the system-related data are collected by the analysis tool 70 via all system nodes SK in the distributed network. To do this, the analysis tool 70 iterates via the individual nodes SK and determines the hardware present therein, for example the performance of the central unit (CPU), or the memory capacity of the system nodes SK, the installed system software, the software from third-party providers, such as the operating system, the configurations of the system nodes SK, such as, for example, the identification address, the node name, the user access set-up and software configurations. The individual nodes are analyzed remotely from a central planning computer PR of the automatic system, which collates the results of the analysis and summarizes them in a system status file 11.

In a second step 2, a new, still empty, system plan 21 is first created by means of the planning tool 20 on the basis of a model of the new system version to which the installed system is to be upgraded. The planning computer 20 then reads in the system status file 11 generated by the analysis tool 70 and maps the individual system components of the installed system onto the corresponding components of the new version. To do this, the planning tool 20 consults the individual system components of the installed version in a mapping table from the underlying planning database and determines the installation requirements and rules for each system component in the new version. For each system component, the mapping table thus identifies which software packages of the new version are to be installed in which sequence on which nodes, which configuration steps are to be performed, which additional hardware requirements exist for the system nodes SK, and on what the new system component is to be installed. The planning tool 20 successively fills the empty model of the newly created system plan 21 with the identified system components of the new version, until the resulting plan finally represents a complete functional mapping of the still installed system onto the new system version.

The configuration data of the still installed system are then transferred by means of the planning tool 20 into the new system plan 21, whereby the configuration data comprise, for example, the designations of the system nodes of the originally installed system, settings of the identical identification addresses, transfers of user access and user rights into the new system.

In an alternative design variant, a specific system version can also be selected from a selection of different possible versions onto which the existing system is to be upgraded via a graphical user interface (GUI) of the planning tool 20 provided in the planning tool 20.

Before the new system software can be set up, the hardware of the individual system nodes SK may need to be adapted according to the requirements of the new version. Thus, in a third step 3, the adaptation of the hardware of the system nodes SK is prepared in that the user is automatically alerted by the analysis tool 70 to any new hardware requirements of the individual system nodes SK which may not have been met. To do this, the analysis tool 70 reads in the corresponding generated installation files 22 from the planning tool 20 and automatically compares these with the current hardware, whereby the system node SK computers can of course only be upgraded manually.

For the installation and configuration of the operating system and the network, individual scripts are allocated in a fourth step 4 to the generated installation files 22 for each system node SK for the automatic installation and configuration of the operating system and the network. Thus, it is automatically ensured, for example, that the correct operating system is pre-installed on the individual servers or clients of the system. The scripts are automatically activated here by a tool 40.

The installation of the new system version of the software components on the individual system nodes SK is carried out in a fifth step 5 in such a way that the list of new software packages to be installed is obtained for each system node SK by means of an installation tool 50 from the installation files 22, which are supplied, for example, by an installation CD, and these software packages are installed according to the predefined sequence on the relevant node SK. The originally installed system software packages of the individual system nodes SK are replaced by means of the installation tool 40 with the new software version, so that the functionality of the entire automatic system is completely restored in the new version.

In a further step 6, the configuration of the software components in the system nodes SK in the new system is carried out by means of a configuration tool 60.

The system software of the upgraded system nodes SK is thus automatically configured following its installation and the previously backed up application data of the automatic system are reloaded into the newly installed and/or extended system software.

In a final step 7, a concluding verification of the successful restoration of all functionalities in the new system version is carried out. To do this, the completeness of the performed steps 1 to 6 is checked by means of the analysis tool and a new system status report 71 is generated with the details of the completed system upgrade and the new system status. The system status report 71 is used, for example, as a system pass for future service activities on the distributed automatic system, in particular for further upgrades.

Figure 3:
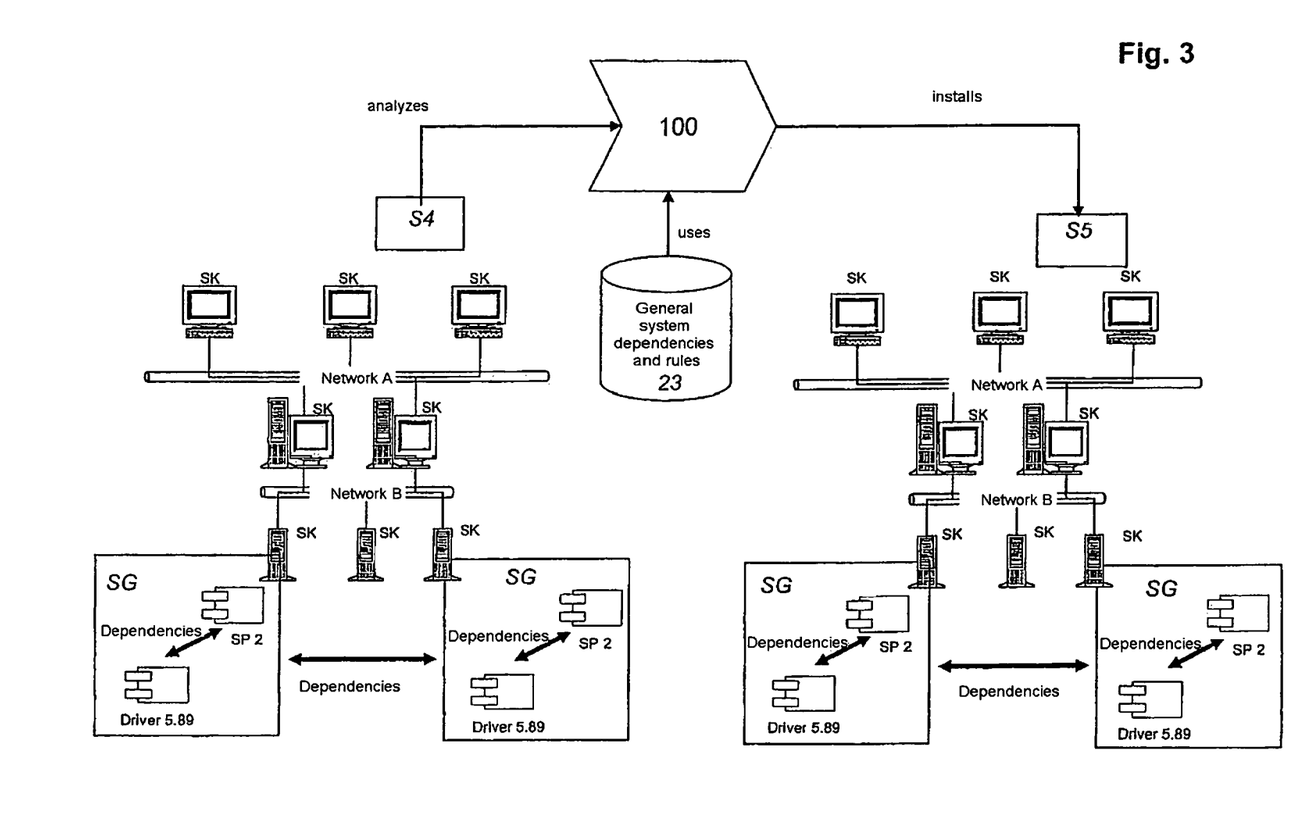
FIG. 3 shows the procedure for automatically upgrading and/or extending system software stored in software packages in an example of a network structure.

FIG. 3 shows the procedure for automatically upgrading system software stored in software packages in an example of a distributed network structure. The example of a network structure comprises the networks A and B with a multiplicity of system nodes SK and the dependencies between the system nodes SK and the control devices SG connected to them.

For upgrading the system software stored in the software packages over a plurality of system nodes SK of the distributed network, observing the logical structure of all the distributed system components, general dependencies and rules for the upgrade 100 of the entire distributed system described in FIGS. 1 and 2 are formulated in the planning database 23, also referred to as the rule database, of the planning tool 20, are administered and automatically checked during the upgrade 100 in the system nodes of the.

The method for the automatic system upgrade 100 maps newer system software S5 onto system software S4 on the basis of the rule database 23 and, with reference to the rules and system dependencies stored in the rule database 23, identifies the adaptations which need to be carried out in the system nodes SK in order to restore a distributed network ready for operation with, as far as possible, the same functionality in the newer version S5.

The invention claimed is:

1. A system for automatically upgrading system software stored, on a non-transitory computer readable medium, in software packages for system nodes arranged in a distributed automatic system of a network, comprising:
    at least one system diagnosis tool, for analyzing a current system status of the distributed automatic system, summarizing the current system status in a system status file by recording for each system node at least current hardware and software installed therein, and for forwarding the system status file to at least one knowledge-based planning tool, wherein a system plan is stored in a separate planning computer, the knowledge-based planning tool for creating a rule-based and data-based system plan for a new system version from at least the installed hardware and software recorded in the system status file and a planning database, the knowledge-based planning tool being configured to create the system plan for the new system version being based on a model of the new system version in which the system status file is used to populate the model of the new system by mapping each system node to a system component of the new system version, generating installation files, a sequence for installing the installation files, and identifying configuration steps to be performed for the installed files for automatic installation and configuration of a system upgrade on the basis of the system plan for each system node of the distributed automatic system, and forwarding the installation files in each case to at least one installation and configuration tool present in each system node, the installation and configuration tool of each system node being configured for automatically selecting from the installation files, installing and configuring software packages to be installed, and restoring the functionality of the distributed automatic system following the configuration of the installed software packages.

2. The system as claimed in claim 1, wherein the system software integrated into the software packages comprises functional components.

3. The system as claimed in claim 1, wherein the system diagnosis tool collects system-related data via the system nodes of the distributed automatic system in order to record the current system status by an analysis tool and summarizes said data in the system status file.

4. The system as claimed in claim 3, wherein the analysis tool automatically carries out at least one of a verification of the functionality of the distributed automatic system and a generation of a status report with information relating to the upgrading of the system software of the distributed automatic system.

5. The system as claimed in claim 3, wherein the analysis tool determines at least one of extensions and adaptations of the hardware of the system nodes of the distributed automatic system.

6. The system as claimed in claim 1, wherein the planning database comprises a model of a new system version with at least one of planning rules, system dependencies, system node types, system limit information, system installation requirements, and system configuration steps.

7. The system as claimed in claim 1, wherein the system diagnosis tool and the installation and configuration tool are arranged in the system nodes of the distributed automatic system.

8. The system as claimed in claim 1, wherein the installation files comprise information relating to at least one of node type and name of each system node, an operating system, requirements for external basic software, additional hardware requirements, a compilation of the software packages to be installed depending on the respective system node, and configuration data of the system nodes.

9. The system as claimed in claim 1, wherein, following the configuration of the installed software packages, at least one of system characteristics and functionalities of the distributed automatic system including at least one of a type and number of operator stations and engineering stations, an ability to communicate with connected control devices with a number of connection stations, supported redundancies of system nodes, selected combinations of client and server structures on the same system node, installations of selected system applications, a type and number of application servers, a number of domain servers or, alternatively, at least one of a selection of at least one of a workgroup and a domain name, at least one of the network characteristics, a division of the network into at least one of a plurality of subnetworks and network redundancies, a name and identification addresses of individual system nodes, created user and access rights of the domain and the automatic system, system names, and further user-specific system configurations are restored.

10. The system as claimed in claim 1, wherein the configuration of the installed software packages can be carried out in a user-controlled manner.

11. A method for automatically upgrading system software stored in software packages for system nodes arranged in a distributed automatic system, comprising:

analyzing a current system status of the distributed automated system by means of a system diagnosis tool, which summarizes a current system in a system status file by recording for each system node at least current hardware and software installed therein, and forwarding the system status file to a knowledge-based planning tool, wherein planning is stored in a separate planning computer, creating a rule-based and data-based system plan for a new system version from the installed hardware and software recorded in the system status file and a planning database by means of the knowledge-based planning tool, the system plan for the new system version being created based on a model of the new system version in which the system status file is used to populate the model of the new system by mapping each system node to a system component of the new system version, generating installation files, a sequence for installing the installation files, and identifying configuration steps to be performed for the installed files for automatic installation and configuration of the system upgrade at each system node of the distributed automatic system on the basis of the created system plan, forwarding the installation files in each case to an installation and configuration tool present at each system node, automatically selecting, installing, and configuring software packages in the installation files by means of the installation and configuration tool of each system node, and restoring the distributed automatic system following the configuration of the installed software packages.

12. The method as claimed in claim 11, wherein functional components are stored in the software packages.

13. The method as claimed in claim 11, wherein system-related data are collected via the system nodes of the distributed automatic system by means of an analysis tool integrated into the system diagnosis tool in order to record the current system status and are summarized in the system status file.

14. The method as claimed in claim 13, wherein at least one of a verification of the functionality of the distributed automatic system is automatically carried out by means of the analysis tool and a status report is generated with information relating to the upgrading of the system software of the distributed automatic system.

15. The method as claimed in claim 13, wherein at least one of necessary extensions and adaptations of the hardware of the system nodes of the distributed system are determined by means of the analysis tool.

16. The method as claimed in claim 11, wherein the model of a new system version with at least one of planning rules, interdependencies of the software packages, definitions of the system node types, configuration combinations, and system restrictions is formed as the planning database.

17. The method as claimed in claim 11, wherein the system diagnosis tool and the installation and configuration tool are arranged in the system nodes of the distributed automatic system.

18. The method as claimed in claim 11, wherein at least one of information relating to the node type and the name of each system node, an operating system, requirements for external basic software, additional hardware requirements, a compilation of the software packages to be installed depending on the respective system node, and configuration data of the system nodes is stored in the installation files.

19. The method as claimed in claim 11, wherein, following the configuration of the installed software packages, system characteristics and functionalities of the distributed automatic system, including at least one of a type and number of operator stations and engineering stations, an ability to communicate with connected control devices with the number of connection stations, supported redundancies of system nodes, selected combinations of at least one of client and server structures on the same system node, installations of selected system applications, a type and number of application servers, a number of domain servers or, alternatively, at least one of a selection of a workgroup and a domain name, at least one of network characteristics, a division of the network into a plurality of subnetworks, and network redundancies, a name and identification addresses of individual system nodes, created user and access rights of the domain and the automatic system, system names and further user-specific system configurations are restored.

20. The method as claimed in claim 11, wherein the configuration of the installed software packages is carried out in a user-controlled manner.

21. The system as claimed in claim 2, wherein the functional components are at least one of application programs and control programs of the distributed network.

22. The method as claimed in claim 12, wherein the functional components are at least one of operating systems, application programs and control programs of the distributed network.

23. The system as claimed in claim 1, wherein the analysis tool is configured to determine whether hardware requirements of the new system version are met by the current hardware installed at each respective system node.

24. The system as claimed in claim 23, wherein the analysis tool is configured to alert a user of new hardware requirements based on the determination.

25. The method as claimed in claim 11, comprising:
determining whether hardware requirements of the new system version are met by the current hardware installed at each respective system node.

26. The method as claimed in claim 25, comprising:
alerting a user at a respective system node of new hardware requirements based on the determination.

27. The system as claimed in claim 1, wherein the knowledge-based planning tool is configured to create the system plan based on a logical structure of distributed system components in the model, which includes dependencies between the system nodes and control devices connected thereto.

28. The method as claimed in claim 11, wherein creating the system plan is based on a logical structure of distributed system components in the model, which includes dependencies between the system nodes and control devices connected thereto.

* * * * *